Inventor
Eric Martin Anderson
By Wilkinson & Mawhinney
Attorneys

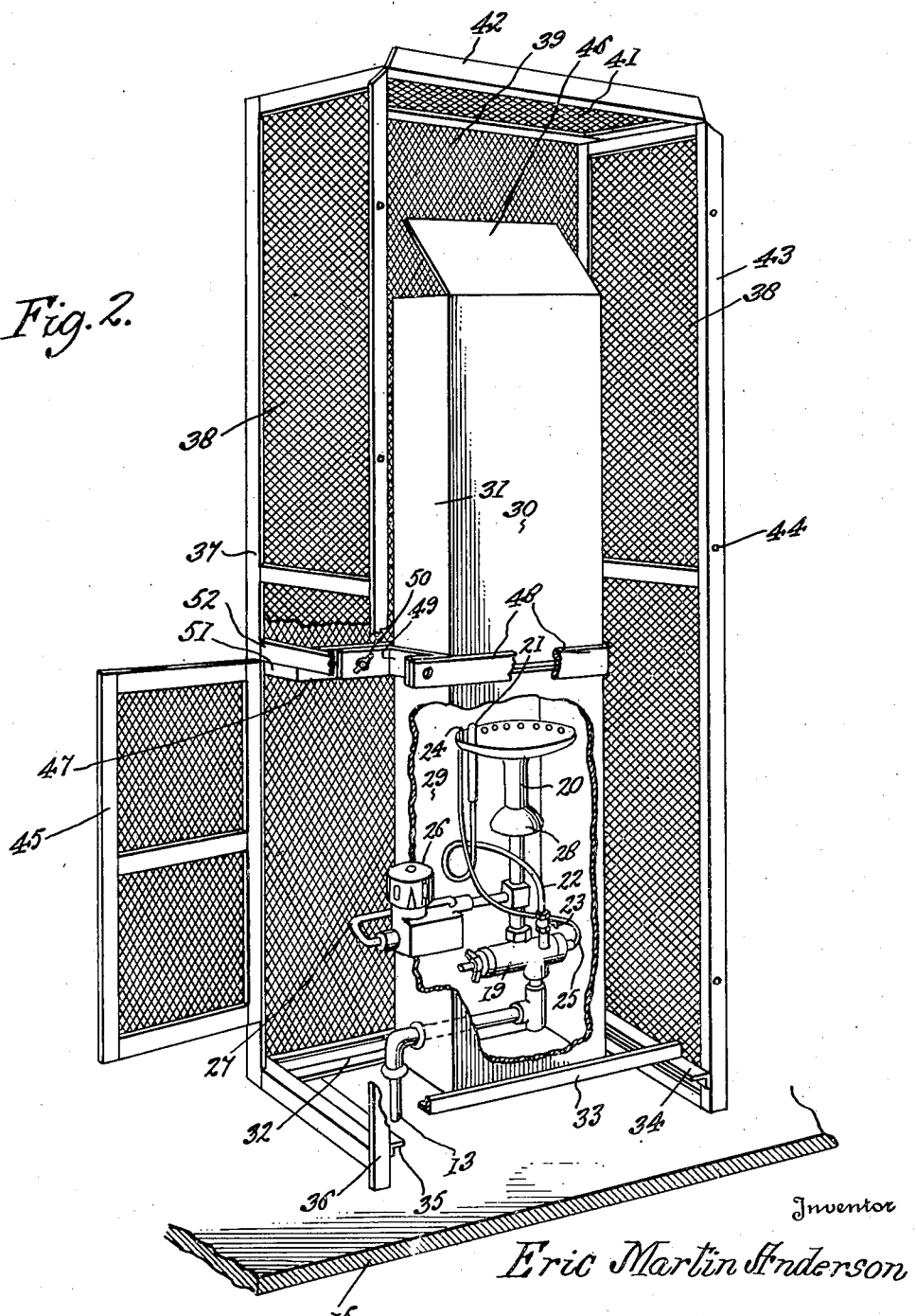

Oct. 11, 1949.  E. M. ANDERSON  2,484,665
PORTABLE TRUCK HEATER
Filed Nov. 17, 1945  3 Sheets-Sheet 3
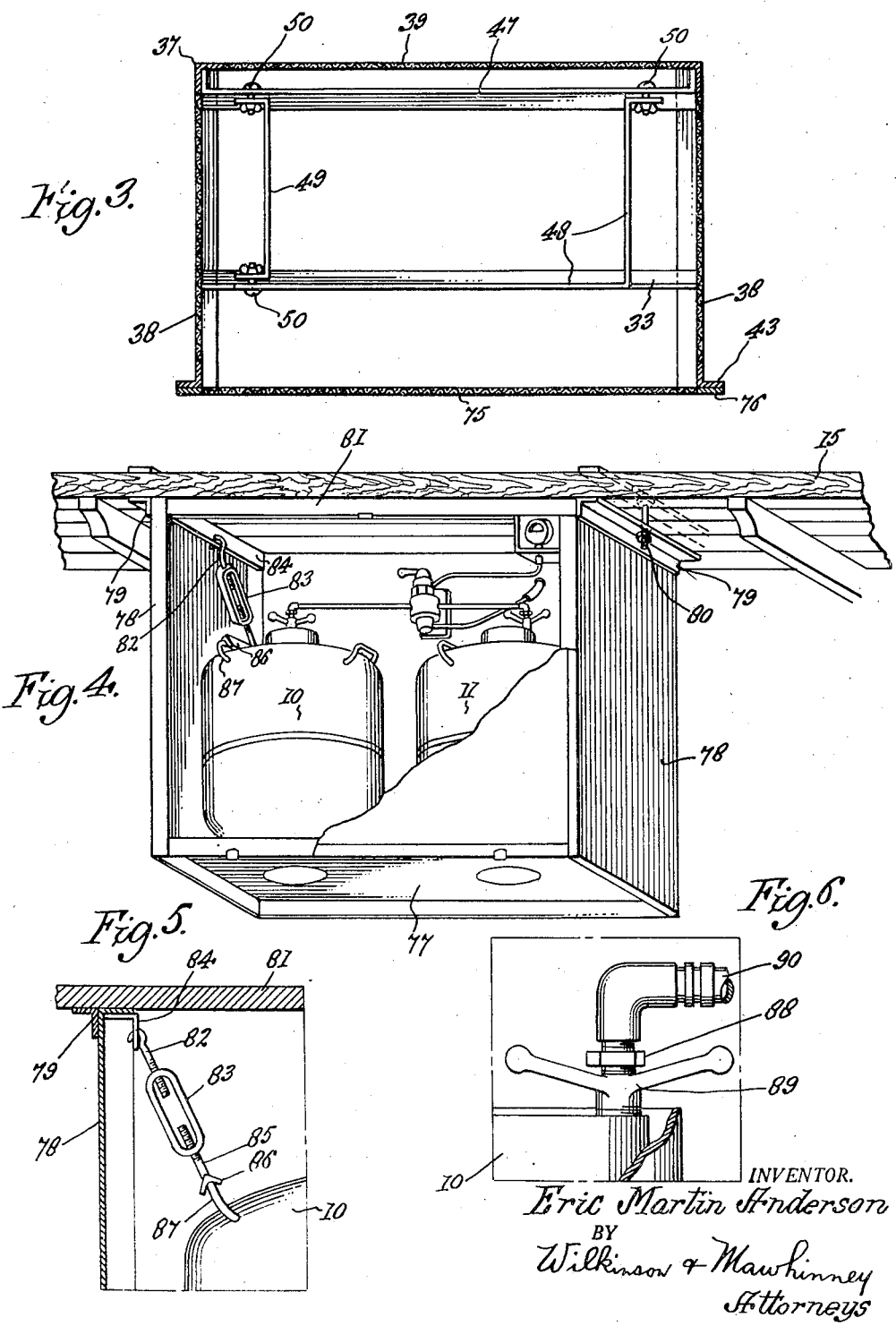
INVENTOR.
Eric Martin Anderson
BY
Wilkinson & Mawhinney
Attorneys Patented Oct. 11, 1949

2,484,665

UNITED STATES PATENT OFFICE 2,484,665

PORTABLE TRUCK HEATER

Eric Martin Anderson, Portland, Maine, assignor to Utilities Distributors, Inc., Portland, Maine, a corporation of Maine Application November 17, 1945, Serial No. 629,267

1 Claim. (Cl. 237—32)

REISSUED

The present invention relates to improvements in portable truck heaters, and has for an object to provide an improved heater, for use in trucks, trailers, freight cars and transportation vehicles generally in which the nature of the merchandise that may be transported is such as to spoil or deteriorate on encountering low or freezing temperatures.

Another object of the invention is to provide an improved heater for trucks and the like which will operate on service and reserve fuel supplies, which admits of servicing without interruption of heat, and provides for long hours of continuous operation.

A further object of the invention is to provide an improved heater of a portable nature so constructed and arranged as to avoid giving off carbon monoxide gas, which is of relatively light weight, of compact and rigid construction and economical in the matter of fuel consumption.

A still further object of the invention is to provide a truck heater of either a portable or stationary nature in which the heater itself and its fuel carrier are constructed as independent units with the heater located in the car or compartment to be protected and heated and with the fuel carrier removed to an external position, for instance underneath the truck or trailer in order to minimize, if not completely avoid, the fire hazard incident to that type of construction in which the fuel carrier with its service and reserve containers are maintained in the car or compartment to be heated.

A still further object of the invention is to provide a tall stationary heater, equipped with thermostat and other controls, all arranged inside the truck and piped to the fuel carrier beneath the truck, with the heater so constructed and arranged that merchandise may be stacked close to the same without fire risk and in which the carrier is accessible from the exterior by authorized persons to remove exhausted containers and to substitute replenished gas bottles or other containers.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a fragmentary side view of a truck trailer, with parts broken away and parts shown in section, with the new heater and fuel carrier mounted thereon, all as constructed in accordance with the present invention, Figure 2 is a perspective view, taken on an enlarged scale and showing the improved heater with the front screen wall removed and with the side door open.

Figure 3 is a horizontal section taken through the heater and cage.

Figure 4 is a perspective view of a modified form of carrier device.

Figure 5 is a fragmentary vertical section taken through the carrier device on an enlarged scale and showing a form of hold-down device for the cylinders, and Figure 6 is a fragmentary side elevation of a portion of the top part of a cylinder with the supply pipe connection thereto and showing a form of lock nut.

Figure 1:
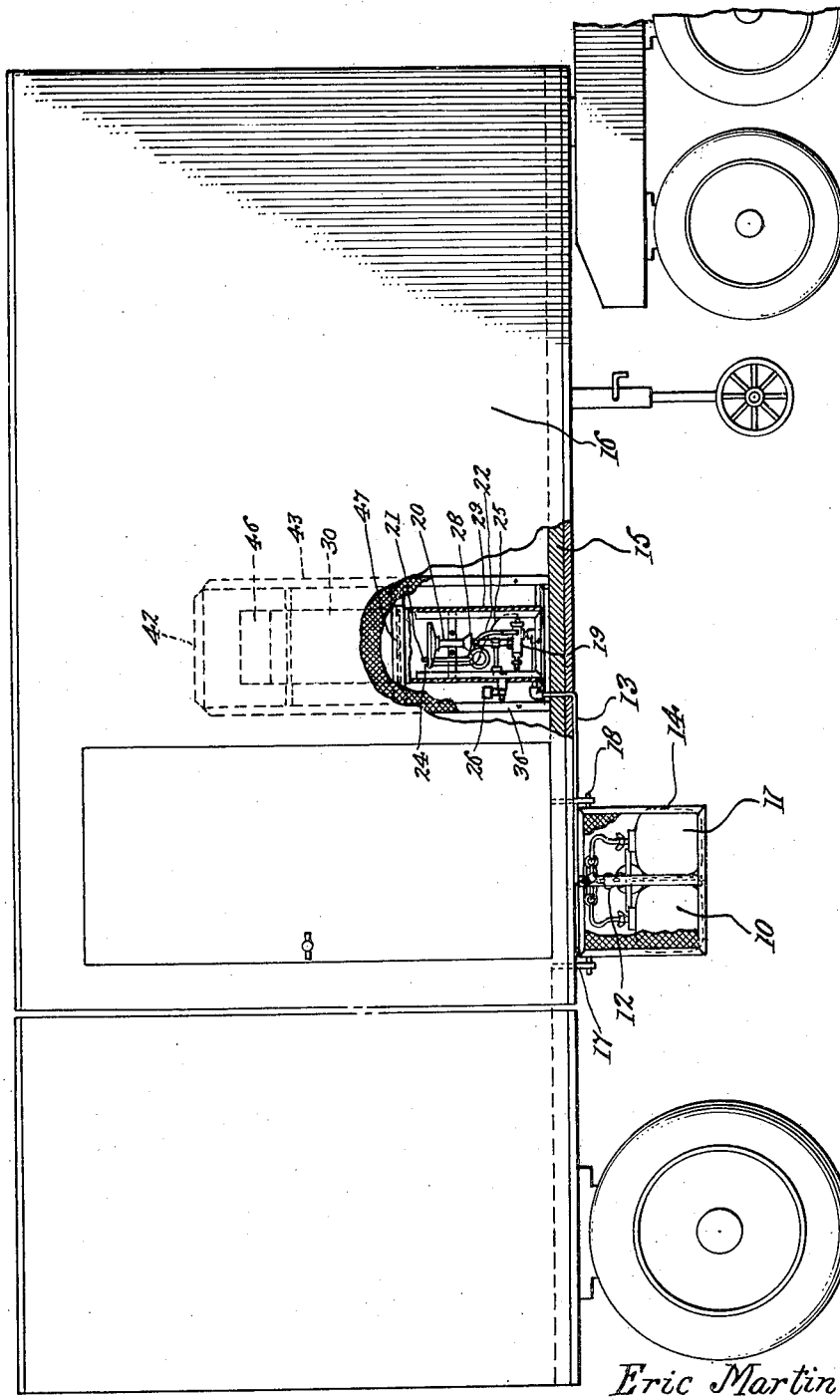

Referring more particularly to the drawings, 10 and 11 designate cylinders, bottles or other containers for the fuel, which are mounted in vertical position in a carrier which also supports the automatic equipment by which one container services the burner while the other container constitutes a reserve which is automatically cut into the fuel supply line to the burner whenever the first container becomes exhausted. Such automatic equipment is well known and is indicated generally at 12. The fuel supply line from such automatic equipment to the burner is represented at 13.

The carrier 14 may be of the type and general construction as shown and described in the Patent No. 2,407,124, granted September 3, 1946, entitled Truck and freight car heaters, or it may be of other suitable form in which adequate provision is made for sustaining the containers 10 and 11 and the automatic equipment 12 in a suitable position externally of and preferably suspended from the bottom 15 of the truck trailer 16 or other vehicle.

In the instance shown, hangers 17 depending from the truck bottom 15 receive pins or bolts 18 which project from the sides of the carrier 14.

The fuel line 13 may lie along the exterior of the bottom 15 until it arrives at the point where the heater is to be interiorly installed within the space of the trailer or car 16; whereupon such fuel pipe 13 is brought up through the bottom 15 and connected with the proper elements of the heater.

The gas supply pipe 13 connects with the casing of a safety cut-off gas valve 19 which regulates the supply to the burner 20. The burner is lighted by a pilot light 21 connected by a pipe 22 with the casing 19 and having in this pipe 22 a pilot cut-off valve 23. The usual thermocouple 24, 25 is shown in association with the pilot 21 and the casing 19; and the usual thermostat 26 is connected by the pipe 27 to the burner supply. The air adjustment for the burner is indicated at 28.

The burner unit is mounted within a flue or heat stack composed of sheet metal imperforate back and front walls 29 and 30 and side walls 31. These walls are of suitable horizontal dimensions to enclose the burner unit and of sufficient vertical height to extend well above the unit. The flue or heat stack is a tube preferably rectangular in cross section and being open at its bottom and its top and has an air baffle.

The bottom must be left open for the ingress of air to the burner to support combustion; while the upper end is baffled to permit the diffusion of heat into the surrounding atmosphere of the trailer or car, or other compartment.

For the purpose of supporting the flue or stack with its bottom completely open, the same may be mounted as to its rear wall 29 and front wall 30 upon the horizontal inturned webs of angle irons 32 and 33 which are supported at their end portions upon the horizontal webs of reversely turned lateral angle irons 34 and 35. It is obvious that the supports 32—35 might be other than of angle iron cross section. These angle irons or other beams may be welded or otherwise secured together at their contact portions and the supports 34, 35 may be sustained in any suitable manner as for instance by welding to the upright members 36 and 37 of the sides 38 of a cage or protector which is completed by the back wall 39 and the front wall 40. It will be noted that the angle irons 34, 35 are at an elevation above the lower ends of the uprights 36, 37.

The protector cage walls may be formed of metal rectangular frames across which are stretched suitable wire. The cage is also provided with a wire top 41 similarly formed. The frame members may be formed with flanges as for instance shown at 42 and 43 to receive the flanged parts of the companion members. The meeting flanges may be perforated and registered, as indicated at 44 to receive rivets, bolts or other fastenings whereby the front panel or the front portions may be held to the cage.

One member of the cage, for instance a side 38 is formed with an opening for giving access to the thermostat 26 which is externally of the flue and also for giving access to other burner parts. This opening may be normally closed by a door 45 hinged to one of the standards 37 and having appropriate means to maintain the door closed.

It is essential that the reticulated or foraminous walls of the protective cage stand away at all points from the normally very hot walls of the flue up through which the products of combustion are circulating and for this purpose the cage is made of appropriate width and general size and it stands to a greater height than the flue so that the top 41 lies close to the top of the trailer and spaced well above the open top of the flue. Preferably the front wall 30 of the flue is formed with an extension which is bent back to a diagonal position intercepting partially the rising products of combustion issuing from the flue so as to constitute a deflector 46.

To maintain the integrity of the flue and cage and to preserve the relative positions of these two complementary members, a connecting device is mounted between the same. This connecting device is formed by bands 47, 48 and 49 (Figures 2 and 3) which are shaped to fit around the flue in tight contact therewith so that these bands assume the rectangular shape of the flue. Fastenings 50 may connect the angled ends of the bands together. The band 47 may have its angled ends affixed to the vertical standards 37 of the cage. A threshold member 52 (Figure 2) for the door 45 may be brazed, soldered, welded or otherwise affixed to the cage frame and if desired also to the ends of the bands 47 and 48. The front screen panel 75 is shown in Figure 3 as having a screen marginal frame 76 fitted to the flanges 43 and affixed thereto in any desired manner.

As shown in Figure 2, the band 47 may subserve the additional function of securing together adjoining sections of the flue where such flue is made in vertically superimposed units. The band 47 is sufficient to span the space between the two sections and may be welded to both sections to form a bridge therebetween.

In the use of the device the external carrier constitutes an ample reservoir of fuel supply and reserve for the maintenance of burner operation over long periods of time including long distance hauling. The stations which service the trucks may also be equipped to service the heaters. The bottles or containers 10, 11 may be kept on hand by such service stations to be loaded into the carriers when the truck arrives for refueling and other items of servicing.

The thermostat 26 may be set for any desirable low indoor temperature and when such temperature is reached the burner 20 will be automatically ignited from the pilot 21. Thus perishables in the trailer or other compartment will be protected against destruction due to unforeseen severe drops in temperature in the area over which the truck is proceeding. The burner will continue in operation until the temperature within the compartment rises above that for which the thermostat 26 has been set.

When the vehicle is in motion, and this is particularly true in the case of trucks and trailers, the vibration incident to such motion has been found to be productive of great fire hazard. This results from the vibration causing loosening of a fitting. For instance the connections into a bottle, where a small leak might start a fire which will meet the fuse plug at times, thus resulting in a serious fire and sometimes explosion. This hazard is eliminated by the removal of the bottles to the exterior of the car.

The protector is a heavy cage made of screen so constructed and arranged that it is substantial enough to allow goods to be piled directly against it. This protector keeps the goods away from the flue. Consequently the cage provides safety within the car and the external fuel carrier provides an additional factor of safety by removing the fuel to a point remote from the heater and separated from the heater by the trailer construction. The interests of safety are accordingly promoted to a higher degree as well as rendering the gas bottles more accessible in that an attendant is not required to enter the trailer, which is often locked in order to replenish exhausted fuel containers.

The ascending products of combustion in the flue encounter the diagonal deflector 46 and are diverted through the back wall 39 or toward the rear end portion of the top 41. This deflector has a tendency to spread the heat horizontally although such heat tends to rise through and above the flue into the upper portion of the car. As the air cools the same will descend by the natural action of convection currents and cold air will enter through the bottom of the flue. Thus a desired circulation of air will be maintained throughout the trailer in order to reach all portions and all products therein.

In Figure 4 a slightly modified form of carrier is shown in which a bottom 77 is supported by the sides 78 with angle irons 79 affixed to the upper portions of the sides for receiving fastenings 80 passing through the floor 15 of the vehicle and supporting the carrier thereto. The carrier also has a roof 81 or a top wall.

As shown more particularly in Figures 4 and 5 the upper hooks 82 of turn buckles 83 are rigidly engaged with angle irons 84 while the lower hooks 85 have pieces of angle iron 86 welded thereto to engage the handles 87 of the cylinders 10. By rotating the turn buckle 83 in the proper direction the ends 82 and 85 may be moved outwardly therefrom to cause the turn buckles to press down upon the cylinders 10, 11 and hold them tightly against their seats in the bottom 77.

Figure 6 shows a lock nut 88 to bind against the wing nut 89 on the pigtail 90 which resists vibration loosening the wing nut.

It is obvious that various changes and modifications may be made in the details of construction and design of the above specifically described embodiment of this invention without departing from the spirit thereof, such changes and modifications being restricted only by the scope of the following claim.

What is claimed is:

An improved heating apparatus for trucks and like vehicles having a closed cargo space, having a gas burning heating unit installed internally within said cargo space, a fuel supply connection, and fuel storage apparatus comprising a carrier suspended from the bottom of the vehicle, means for supporting a pair of bottles vertically and in such position that the bottles are accessible from the exterior of the vehicle and from its cargo space for the detachment of the bottles from said automatic supply equipment and the substitution of the newly replenished bottles, automatic fuel supply equipment in said carrier for detachable connection to the top portion of said bottles and for automatically making a change-over from one bottle to the other as the supply of fuel is exhausted from one such bottle and a fuel supply line running from such equipment into the interior cargo space of the truck.

ERIC MARTIN ANDERSON.

REFERENCES CITED

The following references are of record in the file of this patent:

UNITED STATES PATENTS

| Number | Name | Date |
| --- | --- | --- |
| 1,002,467 | Stelck | Sept. 5, 1911 |
| 1,164,058 | Bayne | Dec. 14, 1915 |
| 1,332,474 | Skelly | Mar. 12, 1920 |
| 2,181,742 | Rumpf | Nov. 28, 1939 |
| 2,321,940 | Robertson | June 15, 1943 |
| 2,364,315 | Powell | Dec. 5, 1944 |
| 2,407,124 | Anderson et al. | Sept. 3, 1946 |

FOREIGN PATENTS

| Number | Country | Date |
| --- | --- | --- |
| 9,033 | Great Britain | 1894 |